GEORGE W. HOWELL.
Improvement in Stovepipe Elbows.
No. 121,104.          Patented Nov. 21, 1871.
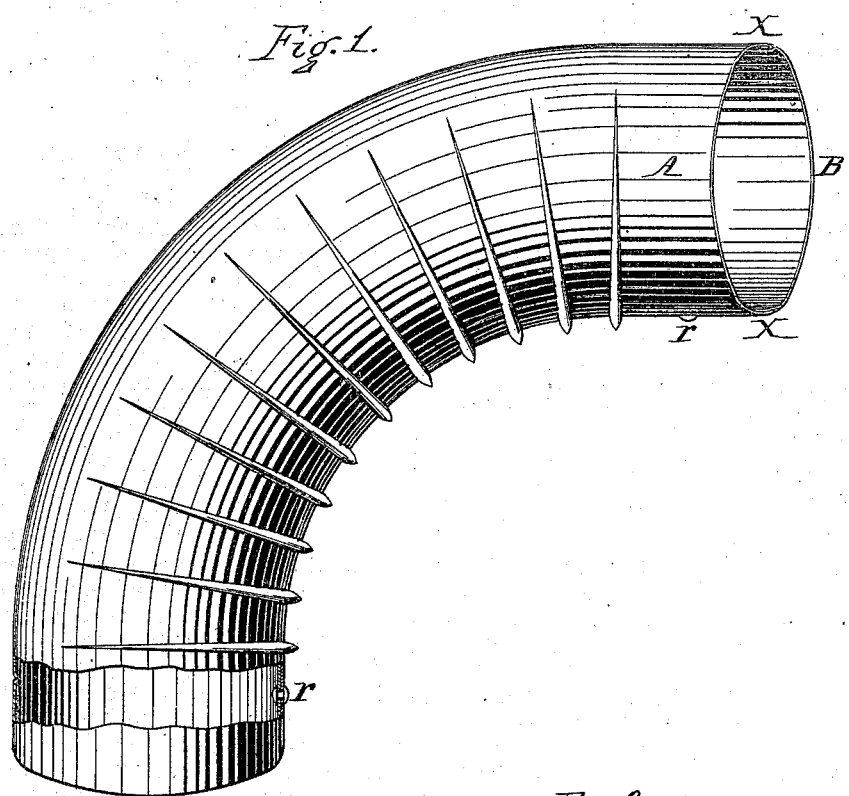
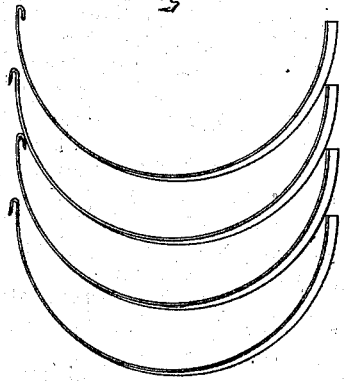
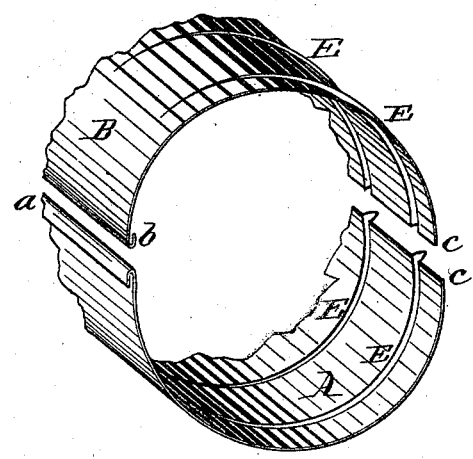
Witnesses.
Inventor.
George W. Howell
By Wood & Boyd
attys

UNITED STATES PATENT OFFICE.

GEORGE W. HOWELL, OF COVINGTON, KENTUCKY.

IMPROVEMENT IN STOVE-PIPE ELBOWS.

Specification forming part of Letters Patent No. 121,104, dated November 21, 1871.

*To all whom it may concern:*

Be it known that I, GEORGE W. HOWELL, of Covington, Kenton county and State of Kentucky, have invented a certain improvement in Stove-Pipe Elbows, of which the following is a specification:

The object of my invention is to make corrugated parts or sections which may be put together and form an elbow; and consists in making the pieces or parts—with the corrugations which give the sections the proper shape, that, when put together, they form an elbow—in such a manner that the sections may be nested or packed together so closely that the section forming the elbow will occupy but little space compared with the same when put together, thereby materially cheapening the cost of the transportation of the manufactured article; secondly, to enable the corrugations to be made in the sections by simply stamping or fluting, which materially cheapens the cost of manufacture. My invention consists, further, in making an elbow of corrugated pieces which can be readily put together by any ordinary workman after the same have been manufactured, without the use of any mechanism to form or shape the parts of which the elbow is constructed; all of which will be more fully understood by reference to the accompanying drawing, in which—

Figure I is a perspective view of the elbow. Fig. II is a sectional view of the parts of which the elbow is constructed. Fig. III is an end view of several parts nested together.

The elbow is preferably made of duplicate parts A B. E E are the corrugations, whose greatest depth is at the point $c$, and which gradually decrease as they approach the opposite sides of the respective parts A B. The abruptness of the curves forming the bow is due to the width and depth of the corrugations. The parts A B have each the same number of corrugations, which are placed in the proper position, so as when put together they form a lap joint by the overlapping of one of the parts upon the other a sufficient distance to be fastened by rivets $r\,r$, as seen in Fig. 1, the corrugations of one of the parts resting or interlapping into the corrugations of the other piece. $a\,b$ are folds to form a seam-joint. The two joints are formed on the line $x\,x$, Fig. I.

The advantages of this mode of construction are obvious. The several parts A B may be manufactured by the same mechanism, and nested or packed for shipment as shown in Fig. III, thereby economizing the cost of transportation. At the same time they can be readily put together after arriving at their destination. When nested, as shown in Fig. III, one of the parts occupies a reversed position to that shown in Fig. II. The cost of manufacture is cheapened when made in two or more parts in the manner herein described, as the corrugations may be stamped or fluted much more rapidly and with less expenditure of power than when made from one piece of metal, as hitherto constructed.

The method of construction may be varied and still accomplish the same ends I have before described; namely, to enable the parts to be manufactured so that they may be closely packed and occupy but little space in shipment, and secondly, to be stamped or fluted by a simple and cheap mechanism. There may be more than two sections used to form the elbow; but this would increase the number of joints, which is to some extent objectionable. The elbow may be constructed to have the joints lie in different planes than those here shown. I have described what I think to be the simplest and best mode of construction and arrangement to accomplish the ends here sought.

Having described my invention, what I claim, and desire to secure by Letters Patent, is—

1. The parts A B, when constructed as herein described, adapted to packing for shipment, substantially as herein set forth.

2. The parts A B when constructed to form sections of stove-pipe elbows, substantially as herein set forth.

3. The elbow, composed of the parts constructed substantially as herein set forth.

GEORGE W. HOWELL.

Witnesses:
J. P. PATTON,
C. P. HOWELL.

(154)